United States Patent
Lee et al.

(10) Patent No.: US 9,710,633 B2
(45) Date of Patent: Jul. 18, 2017

(54) METHOD AND APPARATUS FOR AUTHENTICATING USER

(71) Applicant: SUPREMA HQ INC., Gyeonggi-do (KR)

(72) Inventors: Kideok Lee, Seongnam-si (KR);
Hochul Shin, Seongnam-si (KR);
Hyeonchang Lee, Seongnam-si (KR);
Jae Won Lee, Seongnam-si (KR);
Bong Seop Song, Seongnam-si (KR)

(73) Assignee: Suprema Inc. (KR)

( * ) Notice: Subject to any disclaimer, the term of this patent is extended or adjusted under 35 U.S.C. 154(b) by 0 days.

(21) Appl. No.: 14/982,590

(22) Filed: Dec. 29, 2015

(65) Prior Publication Data
US 2016/0188859 A1  Jun. 30, 2016

(30) Foreign Application Priority Data
Dec. 29, 2014 (KR) ........................ 10-2014-0192289

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| G06F 21/32 | (2013.01) | |
| G06F 21/36 | (2013.01) | |

(52) U.S. Cl.
CPC .............. *G06F 21/32* (2013.01); *G06F 21/36* (2013.01)

(58) Field of Classification Search
CPC ..... G06F 21/32; G06F 21/36; G06Q 20/3274; G06Q 20/3278
USPC .......................................................... 726/18
See application file for complete search history.

(56) References Cited

U.S. PATENT DOCUMENTS

| | | | |
|---|---|---|---|
| 2013/0031623 A1 | 1/2013 | Sanders | |
| 2013/0159699 A1* | 6/2013 | Torkkel | H04L 9/0897 713/155 |
| 2014/0108810 A1* | 4/2014 | Chenna | H04L 9/321 713/179 |
| 2016/0080149 A1* | 3/2016 | Mehta | G06F 21/6218 713/165 |

FOREIGN PATENT DOCUMENTS

| | | |
|---|---|---|
| KR | 10-866839 | 10/2008 |
| KR | 101205738 | 1/2011 |
| KR | 10-1118679 | 2/2012 |
| KR | 10-2012-0084005 | 7/2012 |
| KR | 10-1174700 | 8/2012 |
| KR | 1020140021874 | 8/2012 |
| KR | 101450013 | 12/2013 |
| WO | WO 2007/133037 A1 | 11/2007 |

* cited by examiner

*Primary Examiner* — Dant Shaifer Harriman
(74) *Attorney, Agent, or Firm* — Brinks Gilson & Lione

(57) ABSTRACT

The present disclosure provides a method performed by a user authentication apparatus for authenticating a user of an information processing device. The method includes: visually outputting a code image including predetermined information to allow the information processing device to capture the code image; determining whether an authentication request including the code image and authentication identification information is obtained from the information processing device; and performing a user authentication process based on the authentication identification information after the authentication request is obtained.

2 Claims, 4 Drawing Sheets

METHOD AND APPARATUS FOR AUTHENTICATING USER

CROSS-REFERENCE TO RELATED APPLICATION

This application claims the benefit of Korean Patent Application No. 10-2014-0192289, filed on Dec. 29, 2014, which is incorporated herein by reference in its entirety.

FIELD

The present disclosure relates to a method and an apparatus for authenticating a user.

BACKGROUND

The statements in this section merely provide background information related to the present disclosure and may not constitute prior art.

The industry related to online e-commerce and identification verification is growing because of informationization and the development of the Internet, and there is an increase of using personal authentication such as PINs (Personal Identification Numbers) or passwords.

Meanwhile, user authentication through biometrics has been currently commercialized because of its higher security and cost effectiveness as well as user-friendliness. Although it has been used mainly in embedded systems or personal computers, for example, ATMs (Automated Teller Machines), it is now used even in mobile devices as technology develops.

The characteristic of biometric information including fingerprints does not involve a risk of forgetfulness that is associated with authentication with passwords, and is distinctive and measurable to label and describe a person in question.

The aforementioned biometric information for authentication is converted to digital data to be used in devices, for example, personal computers, portable devices or servers. Therefore, if hacking the devices occurs, biometric information for authentication may be stolen. The biometric information for authentication stolen as described above may have been used for vicious biometric authentication by using forged biometric identities.

Recently, information processing devices have been generally used for carrying out functionalities of smartphones by applying a mobile operating system, for example, Android, i-OS (iPhone-Operating System) and Windows Mobile.

An information processing device to which the aforementioned mobile operating systems are installed provides various information processing services to its user by executing various applications based on the mobile operating systems. Such an information processing device is currently very popular and a portable item to have now.

In addition, as information processing devices, for example, smartphones, are very popular now, code images referred to as a QR (Quick Response) code are widely used. The aforementioned QR code may be encoded, created or decoded in an information processing device with a related application program and a camera, and is a more advanced code system compared with the conventional barcode system in terms of usability and information contents. While a conventional barcode has a one-dimensional configuration in which at most 20-numeral information may be included in its horizontal arrangement, the QR code has a two-dimensional configuration that may contain maximum 7,089 numerals, maximum 4,296 letters, or maximum 1,817 Chinese characters by using its width and length arrangement. Therefore, while a barcode may include just a specific product name or its manufacturer information, a QR code may contain all of long Internet address (URL), photograph or video information, map or name card information.

SUMMARY

The present disclosure provides a method and an apparatus for authenticating a user capable of performing a process of user authentication, in an environment which interworks with an information processing device, for example, a smartphone equipped with a camera to capture a code image in which an application program is installed for encoding, creating and decoding the code image, for example, a QR code, by way of visually outputting the code image including predetermined information to allow the camera to capture the code image and determining whether user authentication request is obtained from the information processing device.

The challenge of the present disclosure is not limited thereto, but other challenges that are not described above will be apparent to those skilled in the art from the following description.

In accordance with the present disclosure, there is provided a method performed by a user authentication apparatus for authenticating a user of an information processing device, the method including visually outputting a code image including predetermined information to allow the information processing device to capture the code image, determining whether an authentication request including the code image and authentication identification information is obtained from the information processing device, and performing a user authentication process based on the authentication identification information after the authentication request is obtained.

Further, said determining whether the authentication request is obtained may include determining that the authentication request is obtained when the authentication identification information includes a telephone number of the information processing device and the code image are received, and said performing the user authentication process may include authenticating the user as an authorized user when the telephone number and the predetermined information extracted from the code image are already registered in the user authentication apparatus.

Further, said determining whether the authentication request is obtained may include determining that the authentication request is obtained when the code image visually outputted by the information processing device is captured by a camera of the user authentication apparatus, and said performing the user authentication process may include extracting a private key by decoding encoded information included in the code image and removing the predetermined information from the decoded information and authenticating the user as an authorized user when the private key is already registered in the user authentication apparatus.

Further, said determining whether the authentication request is obtained may include determining that the authentication request is obtained when the code image visually outputted by the information processing device is captured by a camera of the information processing device and biometric information of the user is inputted, and said performing the user authentication process may include extracting a private key by decoding encoded information included in the code image and removing the predetermined information from the decoded information and authenticating the user as an authorized user when the private key is already registered and the biometric information matches biometric information previously stored in the user authentication apparatus.

Further, the method may further include visually outputting an updated code image including information about an updated private key to allow the information processing device to capture the updated code image when the user is authenticated as the authorized user.

In accordance with the present disclosure, there is provided a user authentication apparatus for authenticating a user of an information processing device, the apparatus including an image output unit configured to visually output a code image including predetermined information to allow an information processing device to capture the code image, an authentication request recognition unit configured to determine whether an authentication request including the code image and authentication identification information is obtained from the information processing device, and an authentication unit configured to perform a user authentication process based on the authentication identification information after the authentication request is obtained.

Further, the authentication request recognition unit may be configured to determine that the authentication request is obtained when a telephone number of the information processing device and the code image are received, and the authentication unit may be configured to authenticate the user as an authorized user when the telephone number and the predetermined information extracted from the code image are already registered in the user authentication apparatus.

Further, the authentication request recognition unit may be configured to determine that the authentication request is obtained when the code image visually outputted by the information processing device is captured by a camera of the user authentication apparatus, and the authentication unit may be configured to decode encoded information included in the code image and remove the predetermined information from the decoded information to extract a private key and authenticate the user as an authorized user when the private key is already registered in the user authentication apparatus.

Further, the authentication request recognition unit may be configured to determine that the authentication request is obtained when the code image visually outputted by the information processing device is captured by a camera of the information processing device and biometric information of the user is inputted, and the authentication unit may be configured to decode encoded information included in the code image and removes the predetermined information from decoded information to extract a private key and authenticate the user as an authorized user when the private key is already registered and the biometric information matches the biometric information previously stored in the user authentication apparatus.

Further, the image output unit may be configured to visually output an updated code image including information about an updated private key to allow the information processing device to capture the updated code image when the user is authenticated as the authorized user.

As set forth above, the method and the apparatus in accordance with the present disclosure performs a process of authenticating a user, in an environment which interworks with an information processing device, for example, a smartphone having a camera to capture a code image in which an application program is installed for encoding, creating and decoding the code image, for example, a QR code, by way of visually outputting the code image including predetermined information to allow the camera to capture the code image and determining whether user authentication request is obtained from the information processing device.

Therefore, it is possible to fundamentally avoid biometric information being stolen through the substitution or supplement for biometric information-based user authentication and enhance the security of user authentication by utilizing the information processing device such as a smartphone.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, well-known functions and/or constitutions will not be described in detail if they would unnecessarily obscure the features of the present disclosure in unnecessary detail. Further, the terms to be described below are defined in consideration of their functions in the embodiments of the present disclosure and may vary depending on a user's or operator's intention or practice. Accordingly, the definition may be made on a basis of the content throughout the specification.

Figure 1:
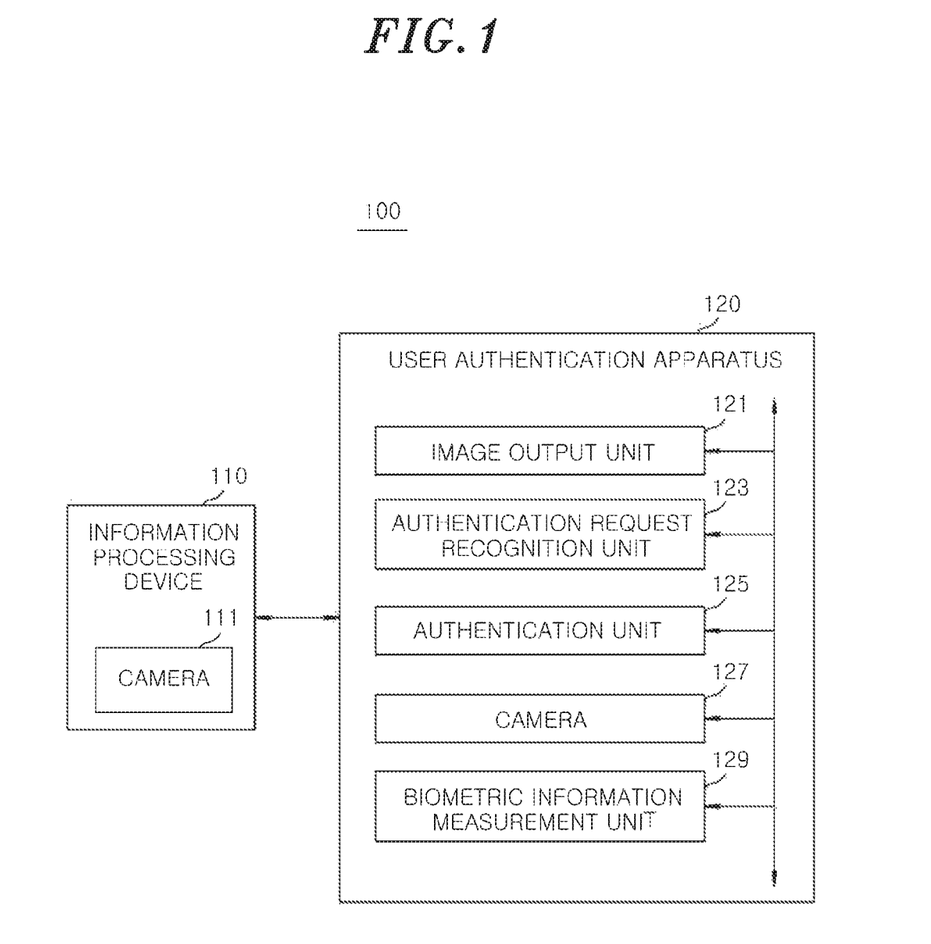
FIG. 1 shows a configuration of a user authentication system including a user authentication apparatus in accordance with an embodiment of the present disclosure.

FIG. 1 shows a configuration of a user authentication system including a user authentication apparatus in accordance with an embodiment of the present disclosure.

As shown in FIG. 1, the user authentication system 100 in accordance with the embodiment includes an information processing device 110 and a user authentication apparatus 120. The user authentication apparatus 120 includes an image output unit 121, an authentication request recognition unit 123, an authentication unit 125, a camera 127, and a biometric information measurement unit 129.

The information processing device 110 may be a smartphone equipped with an application program for encoding, creating and decoding code images, for example, a QR code, and a camera 111 thereof for capturing code images.

The information processing device 110 may capture a code image including predetermined information by means of the camera 111 thereof when the code image is visually outputted by the user authentication apparatus 120. Further, the information processing device 110 may send the captured code image and a message for requesting user authentication including its telephone number assigned to the user authentication apparatus 120.

In addition, the information processing device 110 may capture a code image including predetermined information by means of the camera 111 thereof when the code image is visually outputted by the user authentication apparatus 120, extract the predetermined information included in the captured code image, create a code image including a private key issued in advance and the extracted predetermined information, and then visually output the created code image to be captured by the camera 111.

The user authentication apparatus 120 visually outputs the code image including the predetermined information to be captured by the camera 111, determines whether user authentication request is obtained from the information processing device 110 that captured the code image by means of the camera 111, and performs the process of authenticating a user by using authentication identification information included in the code image if it determines that user authentication request is obtained.

The components of the user authentication apparatus 120 are described hereinbelow in detail.

The image output unit 121 visually outputs a code image including predetermined information to allow the camera 111 of the information processing device 110 to capture it. In addition, the image output unit 121 visually outputs a code image including information about an updated private key to allow the camera 111 of the information processing device 110 to capture it if the user of the information processing device 110 is authenticated as an authorized user.

The authentication request recognition unit 123 determines whether user authentication request is obtained from the information processing device 110 that captured the code image by means of its camera 111. The authentication request recognition unit 123 may determine that user authentication request is obtained if a code image, which includes a telephone number of the information processing device 110 and predetermined information, is received. Further, the authentication request recognition unit 123 may determine that user authentication request is obtained if a code image visually outputted by the information processing device 110 is captured by the camera 127. In addition, the authentication request recognition unit 123 determines that user authentication request is obtained if the code image visually outputted by the information processing device 110 is captured by the camera 127 and biometric information is inputted through the biometric information measurement unit 129.

The authentication unit 125 performs the process of authenticating a user through the use of the authentication identification information included in the code image when the request for user authentication is recognized by the authentication request recognition unit 123. For example, the authentication unit 125 may authenticate the user as an authorized user if the telephone number and predetermined information received from the information processing device 110 are already registered. Further, the authentication unit 125 may remove predetermined information from the decoded information obtained by decoding the encoded information included in the code image captured by the camera 127 to extract a private key. The authentication unit 125 may then authenticate the user as an authorized user if the extracted private key is already registered. In addition, the authentication unit 125 may remove predetermined information from the decoded information obtained by decoding the encoded information included in the code image captured by the camera 127 to extract a private key. The authentication unit 125 may then authenticate the user as an authorized user if the extracted private key is already registered and the user's biometric information provided through the biometric information measurement unit 129 matches the biometric information for authentication stored by the same user in advance.

The camera 127 captures and then provides the code image visually outputted by the information processing device 110 to the authentication unit 125. In addition, in case where the user authentication apparatus 120 has a capability of performing face recognition, the camera 127 may capture and then provide user's face image to the biometric information measurement unit 129 for face recognition.

The biometric information measurement unit 129 measures biometric information of a user of the information processing device 110 and provides obtained biometric information to the authentication unit 125. For example, the biometric information measurement unit 129 may obtain and then provide user's fingerprint image to the authentication unit 125.

Figure 2:
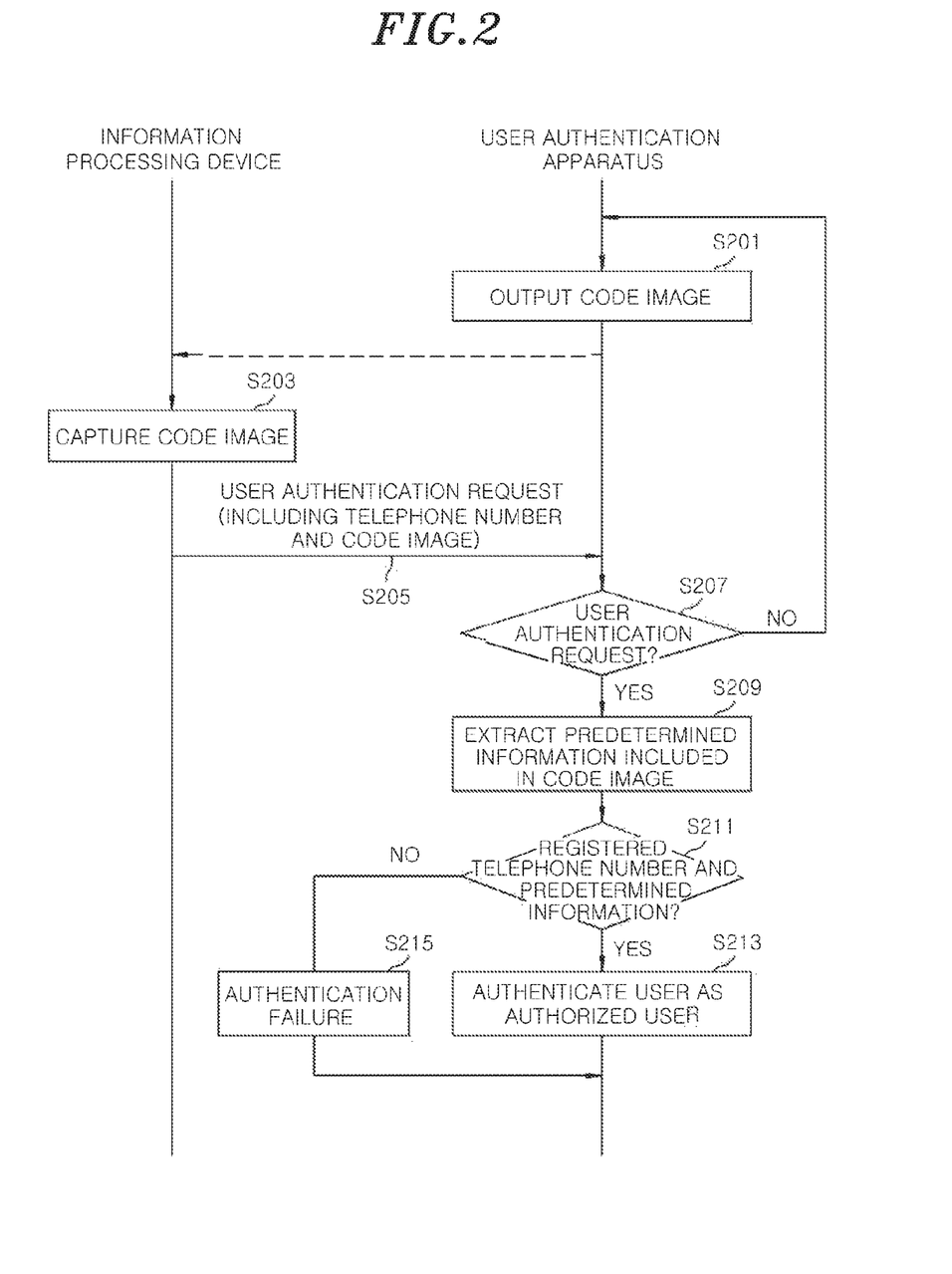
FIGS. 2 to 4 show flow diagrams a method for illustrating user authentication in accordance with embodiments of the present disclosure.
Figure 3:
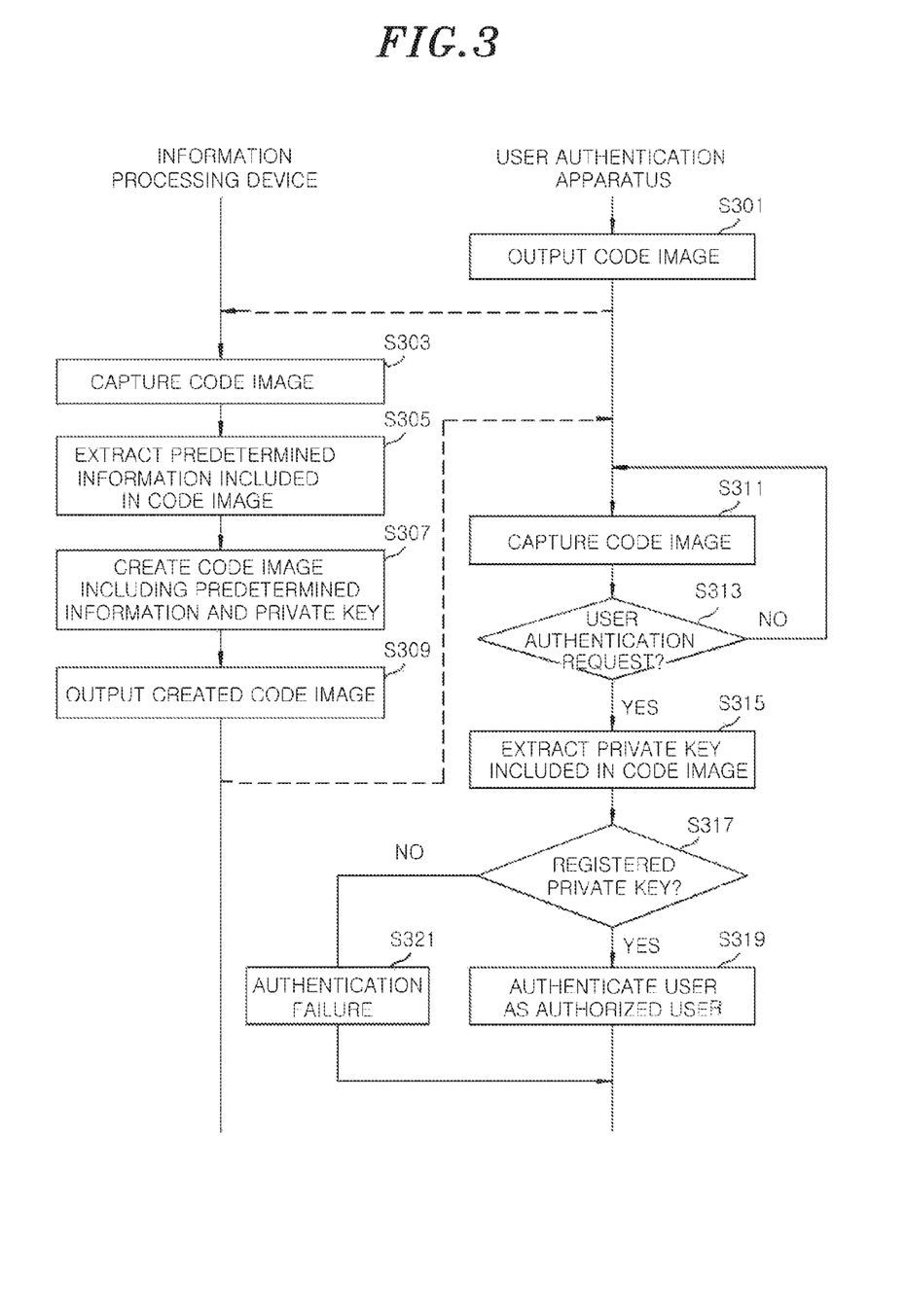
Figure 4:
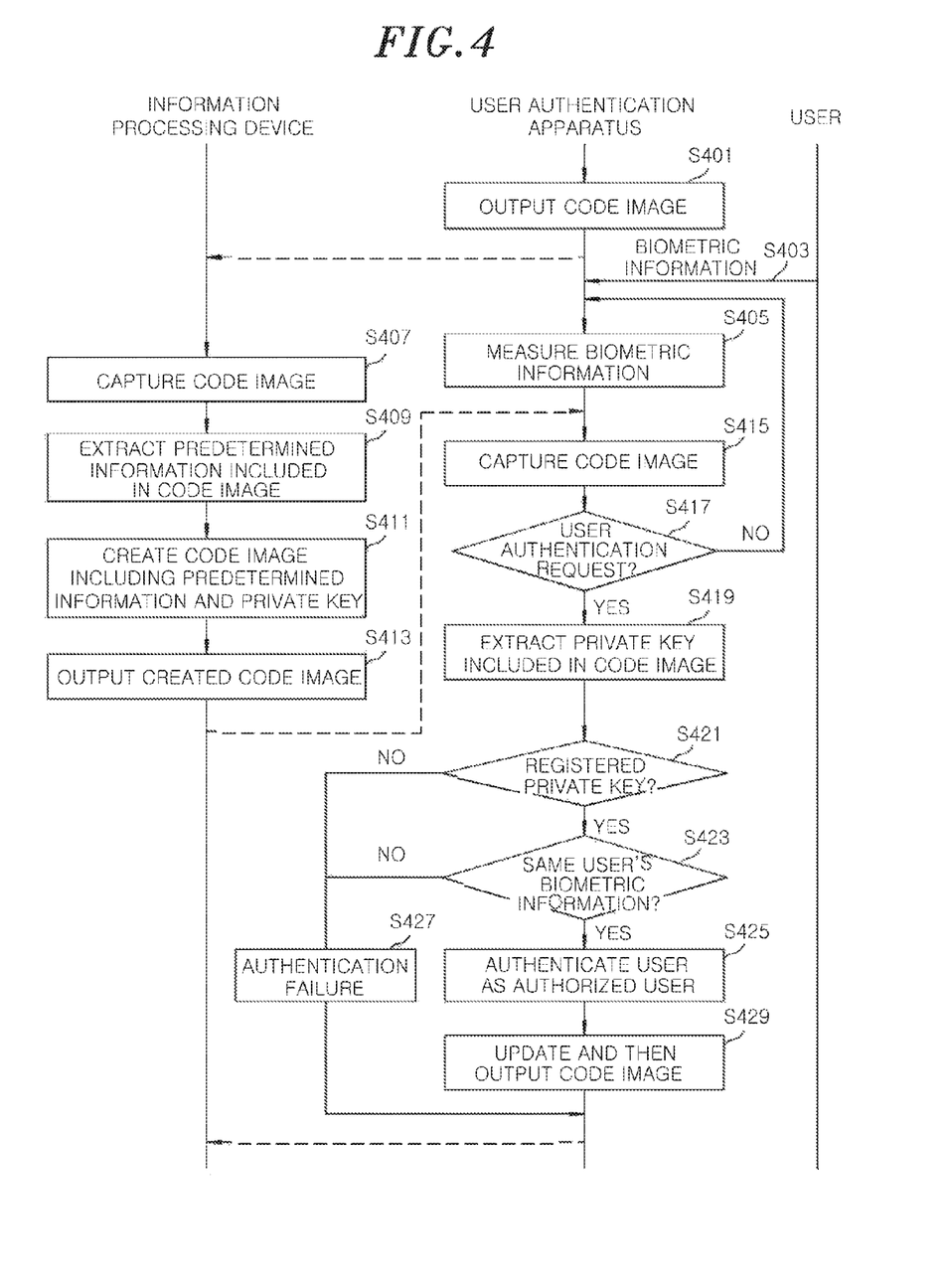

The user authentication apparatus 120 including the aforementioned components may authenticate a user in accordance with the embodiments illustrated in FIGS. 2 to 4, and be implemented without the camera 127 and the biometric information measurement unit 129 if required.

FIGS. 2 to 4 show flow diagrams for illustrating a method for authenticating a user in accordance with embodiments of the present disclosure.

The method in accordance with the embodiment shown in FIG. 2 includes operation S201 for visually outputting a code image including predetermined information to allow the camera of the information processing device to capture it.

The method further includes operations S203 to S207 for determining whether user authentication request is obtained from the information processing device that captured the code image by means of the camera thereof. In this case, it is determined that user authentication request is obtained if the telephone number of the information processing device and the code image are received.

In addition, the method further includes operations S209 to S215 for performing the process of authenticating a user by using the authentication identification information included in the code image, when it is determined that user authentication request is obtained. In this case, the user is authenticated as an authorized user in case where the received telephone number and the predetermined information are already registered.

In the embodiment shown in FIG. 3, the method includes operation S301 for visually outputting the code image including predetermined information to allow the camera of the information processing device to capture the code image.

The method further includes operations S303 to S313 for determining whether user authentication request is obtained from the information processing device that captured the code image by means of the camera thereof. In this case, when the code image visually outputted by the information processing device is captured by the camera, it may be determined that user authentication request is obtained.

In addition, the method includes operations S315 to S321 for authenticating a user by using authentication identification information included in the code image when it is determined that user authentication request is obtained. In the operations, the private key is extracted by removing the predetermined information from the decoded information obtained by decoding the encoded information included in the captured code image, and the user may then be authenticated as an authorized user if the extracted private key is already registered.

In the embodiment shown in FIG. 4, the method includes operation S401 for visually outputting a code image including predetermined information to allow the camera of the information processing device to capture the code image.

In addition, the method further includes operations S403 to S417 for determining whether user authentication request is obtained from the information processing device that captured the code image by means of the camera thereof. In this case, it may be determined that user authentication request is obtained when the code image visually outputted by the information processing device is captured by the camera and biometric information is inputted.

In addition, upon determining that user authentication request is obtained, the method further includes operations S419 to S427 for performing the process of authenticating a user by using authentication identification information included in the code image. In the operations, the private key is extracted by removing the predetermined information from the decoded information obtained by decoding the encoded information included in the captured code image, and the user may then be authenticated as an authorized user if an extracted private key is already registered and the inputted biometric information matches the biometric information for authentication stored by the same user in advance.

Furthermore, the method further includes operation S429 for visually outputting a code image including the information about the private key updated to allow the camera of the information processing device to capture the code image when the user of the information processing device is authenticated as an authorized user.

Referring to FIGS. 1 to 4, the process of authenticating a user by the user authentication system including the user authentication apparatus in accordance with the embodiments of the present disclosure will be described hereinafter in more detail.

First Embodiment (See FIGS. 1 and 2)

First, a telephone number for authenticating a user as an authorized user is registered with and stored in advance in the user authentication apparatus 120. Predetermined information or a code image including the predetermined information used for user authentication is registered with and stored in advance in the user authentication apparatus 120. The aforementioned telephone number and the code image may be stored in an internal memory of the authentication unit 125 or a separate memory.

At this state, the image output unit 121 of the user authentication apparatus 120 visually outputs the code image including predetermined information to allow the camera 111 of the information processing device 110 to capture the code image at operation S201.

Next, the user of the information processing device 110 captures the code image being outputted in the user authentication apparatus 120 by operating the camera 111 if user authentication is required, at operation S203.

Subsequently, the user of the information processing device 110 requests the user authentication apparatus 120 to authenticate him/her by using the captured code image. For example, the information processing device 110 may send a user authentication request message to the user authentication apparatus 120 through a mobile communication network at operation S205, the aforementioned user authentication request message including the telephone number and the code image captured at operations S203.

Meanwhile, after outputting the code image at operation S201, the user authentication apparatus 120 is ready for receiving user authentication request by the information processing device 110. When receiving a user authentication request message including the telephone number of the information processing device 110 and the code image, the authentication request recognition unit 123 determines that user authentication request is obtained from the information processing device 110 at operation S207.

Thereafter, at operation S205, the authentication unit 125 performs the process of authenticating a user by using the authentication identification information included in the code image received when the authentication request recognition unit 123 determines that user authentication request is obtained.

To this end, the authentication unit 125 decodes the encoded information included in the code image received at operation S205 to extract predetermined information from the decoded information, at operation S209.

Subsequently, the authentication unit 125 checks whether the telephone number included in the user authentication request message matches the telephone number registered in advance and the predetermined information extracted from the code image at operation S209 matches the predetermined information registered in advance at operation S211.

The authentication unit 125 authenticates the user of the information processing device 110 as an authorized user at operation S213 if the check result reveals matching of the telephone number and the predetermined information at operation S213. If any one of the telephone number and the predetermined information does not match, the authentication unit 125 notifies the user of the information processing device 110 of authentication failure at operation S215.

Second Embodiment (See FIGS. 1 and 3)

First, a private key is issued to the information processing device 110 owned by a user. The private key issued to the information processing device 110 and a code image including predetermined information is registered with and stored in the user authentication apparatus 120 in advance. The private key and the code image may be stored in an internal memory of the authentication unit 125 or a separate memory.

At this state, the image output unit 121 of the user authentication apparatus 120 visually outputs the code image including predetermined information to allow the camera 111 of the information processing device 110 to capture the code image at operation S301.

After that, the user of the information processing device 110 captures the code image being outputted by the user authentication apparatus 120 through camera operation if user authentication is required, at operation S303.

Subsequently, the information processing device 110 decodes the encoded information included in the captured code image to extract the predetermined information from the decoded information at operation S305, encodes and creates a code image including both the extracted predetermined information and the private key issued in advance at operation S307. The information processing device 110 then visually outputs the created code image to allow the camera 127 of the user authentication apparatus 120 to capture the code image at operation S309.

Meanwhile, after outputting the code image at operation S301, the user authentication apparatus 120 is ready for receiving user authentication request by the information processing device 110, and captures a code image by means of the camera 127 when the code image is outputted by the information processing device 110, at operation S311.

In this case, the authentication request recognition unit 123 determines that user authentication request is obtained from the information processing device 110 when the code image captured by the camera 127 is inputted, at operation S313.

Subsequently, at operation S315, the authentication unit 125 decodes the encoded information included in the code image captured at operation S311 to extract a private key from the decoded information when the authentication request recognition unit 123 determines that user authentication request is obtained.

Thereafter, the authentication unit 125 checks whether the private key extracted at operation S315 matches the private key issued in advance to the information processing device 110 to determine whether they match each other at operation S317.

The authentication unit 125 authenticates, at operation S321, the user of the information processing device 110 as an authorized user at operation S319 if the check result reveals matching between the private keys at operation S317. Otherwise, the authentication unit 125 notifies the user of the information processing device 110 of authentication failure.

Third Embodiment (See FIGS. 1 and 4)

First, a private key is issued to the information processing device 110 used by a user. Biometric information used for user authentication is obtained from the user of the information processing device 110, registered and stored in advance for user authentication. The private key and the biometric information for authentication may be stored in an internal memory of the authentication unit 125 or a separate memory.

At this state, the image output unit 121 of the user authentication apparatus 120 visually outputs a code image including predetermined information at operation S401 to allow the camera 111 of the information processing device 110 to capture the code image.

Furthermore, the user of the information processing device 110 provides the biometric information to the user authentication apparatus 120 if user authentication is required. For example, the user cooperates with the user authentication apparatus 120 to capture a face image or fingerprint image at operation S403. Therefore, the camera 127 may obtain user's face image or the biometric information measurement unit 129 may obtain user's fingerprint image at operation S405.

In addition, the user of the information processing device 110 captures the code image being outputted by the user authentication apparatus 120 through camera operation at operation S407.

Subsequently, the information processing device 110 decodes the encoded information included in the code image captured to extract the predetermined information from the decoded information at operation S409, encodes and creates a code image including both the extracted predetermined information and the private key issued in advance at operation S411, and visually outputs the created code image to allow the camera 127 of the user authentication apparatus 120 to capture the code image at operation S413.

Meanwhile, after outputting the code image at operation S401, the user authentication apparatus 120 is ready for receiving user authentication request by the information processing device 110, and captures a code image by means of the camera 127 when the code image is outputted by the information processing device 110 at operation S415.

In this case, the authentication request recognition unit 123 determines that user authentication request is obtained from the information processing device 110 when the code image captured by the camera 127 is inputted and the biometric information for user authentication is obtained by the camera 127 and the biometric information measurement unit 129, at operation S417.

Subsequently, at operation S419, the authentication unit 125 decodes the encoded information included in the code image captured at operation S415 to extract a private key from the decoded information when the authentication request recognition unit 123 determines that user authentication request is obtained.

Subsequently, the authentication unit 125 checks whether the private key extracted at operation S419 matches the private key issued in advance to the information processing device 110 at operation S421. In addition, the authentication unit 125 examines whether the biometric information obtained at operation S405 matches the biometric information for user authentication registered in advance at operation S423.

At operation S425, the authentication unit 125 authenticates the user of the information processing device 110 as an authorized user if the examination reveals matching between the private keys at operation S421 and the biometric information inputted at operation S423 matches the biometric information for user authentication stored by the same user in advance. If, however, the examination reveals that the private keys are different or the biometric information is obtained from a different user, the authentication unit 125 notifies the user of the information processing device 110 of authentication failure at operation S427.

As described above, after the user of the information processing device 110 is authenticated as an authorized user by the authentication unit 125, the image output unit 121 may update the private key issued to the information processing device 110, and visually output an updated code image including the predetermined information and the updated private key after encoding and creating the updated code image to allow the camera 111 of the information processing device 110 to capture the updated code image, at operation S429.

Subsequently, the information processing device 110 may capture the updated code image being outputted by the user authentication apparatus 120 by means of the camera 111 thereof, and extract the updated private key from the updated code image to substitute the updated private key for the private key used so far. Therefore, although the private key is stolen, security is immediately enhanced in preparation of the updated private key.

As described above, in accordance with the embodiments of the present disclosure, a user authentication is achieved by determining whether user authentication is requested by an information processing device after visually outputting a code image including predetermined information to allow a camera to capture the code image, in an environment which interworks with the information processing device such as a smartphone equipped with a camera in which an application program is installed for encoding, creating and decoding the code image, for example, a QR code.

Therefore, the embodiments of the present disclosure may reduce biometric information being stolen through the substitution or supplement for biometric information-based user authentication. Furthermore, the embodiments may enhance the security of user authentication by using the information processing device, for example, a smartphone which is very popular as a mobile item to have.

The combinations of respective sequences of a flow diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create means for performing functions described in the respective sequences of the sequence diagram. Since the computer program instructions, in order to implement functions in specific manner, may be stored in a memory useable or readable by a computer or a computer for other programmable data processing apparatus, the instruction stored in the memory useable or readable by a computer may produce manufacturing items including an instruction means for performing functions described in the respective sequences of the sequence diagram. Since the computer program instructions may be loaded in a computer or other programmable data processing apparatus, instructions, a series of sequences of which is executed in a computer or other programmable data processing apparatus to create processes executed by a computer to operate a computer or other programmable data processing apparatus, may provide operations for executing functions described in the respective sequences of the flow diagram.

Moreover, the respective sequences may indicate some of modules, segments, or codes including at least one executable instruction for executing a specific logical function(s). In some alternative embodiments, it is noted that the functions described in the sequences may run out of order. For example, two consecutive sequences may be substantially executed simultaneously or often in reverse order according to corresponding functions.

The explanation as set forth above is merely described a technical idea of the exemplary embodiments of the present disclosure, and it will be understood by those skilled in the art to which this present disclosure belongs that various changes and modifications may be made without departing from the scope of the characteristics of the embodiments of the present disclosure. Therefore, the exemplary embodiments disclosed herein are not used to limit the technical idea of the present disclosure, but to explain the present disclosure, and the scope of the technical idea of the present disclosure is not limited to these embodiments. Therefore, the scope of protection of the present disclosure should be construed as defined in the following claims and changes, modifications and equivalents that fall within the technical idea of the present disclosure are intended to be embraced by the scope of the claims of the present disclosure.

What is claimed is:

1. A method performed by a user authentication apparatus having a first camera for authenticating a user of an information processing device, an image output unit, an authentication request recognition unit and an authentication unit, the method comprising:
   visually outputting, by using the image output unit, a first code image including predetermined information to allow a second camera included in the information processing device to capture the first code image;
   determining, by using the authentication request recognition unit, that an authentication request is obtained when a second code image visually outputted by the information processing device is captured by the first camera of the user authentication apparatus and biometric information of the user is obtained by the first camera of the user authentication apparatus;
   extracting, by using the authentication unit, a private key by decoding encoded information included in the second code image and removing the predetermined information from the decoded information; and
   authenticating, by using the authentication unit, the user as an authorized user when the private key is already registered in the user authentication apparatus and the biometric information matches biometric information previously stored in the user authentication apparatus;
   visually outputting, by using the image output unit, a third code image including information about an updated private key to allow the information processing device to capture the third code image when the user is authenticated as the authorized user.

2. A user authentication apparatus having a first camera for authenticating a user of an information processing device, the apparatus comprising:
   an image output unit configured to visually output a first code image including predetermined information to allow a second camera included in an information processing device to capture the code image;
   an authentication request recognition unit configured to determine that an authentication request is obtained when a second code image visually outputted by the information processing device is captured by the first camera of the user authentication apparatus and biometric information of the user is obtained by the first camera of the user authentication apparatus; and
   an authentication unit configured to extract a private key by decoding encoded information included in the second code image and removing the predetermined information from the decoded information and configured to authenticate the user as an authorized user when the private key is already registered in the user authentication apparatus and the biometric information matches biometric information previously stored in the user authentication apparatus;
   visually outputting, by using the image output unit, a third code image including information about an updated private key to allow the information processing device to capture the third code image when the user is authenticated as the authorized user;
   wherein the image output unit is further configured to visually output an updated code image including information about a third private key to allow the information processing device to capture the third code image when the user is authenticated as the authorized user.

* * * * *